Figure 1:
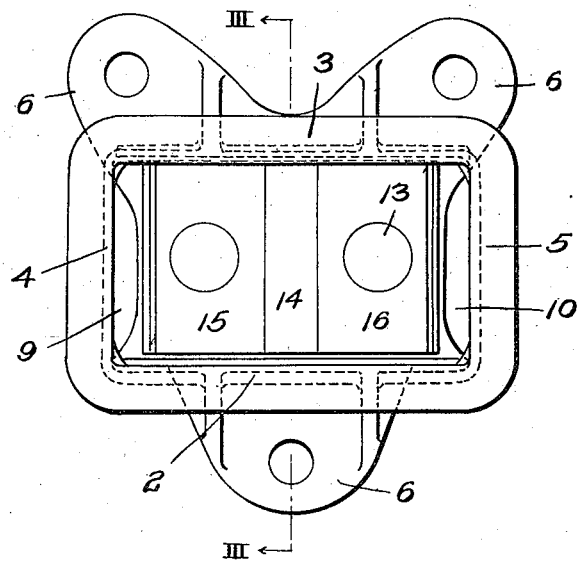

Dec. 11, 1923.  1,477,196

A. STUCKI

ROLLER SIDE BEARING

Filed May 12, 1922

WITNESSES
J. Herbert Bradley
CR Halbert

INVENTOR
Arnold Stucki
By Winter & Brown
his Attys.

Patented Dec. 11, 1923.

1,477,196

UNITED STATES PATENT OFFICE.

ARNOLD STUCKI, OF PITTSBURGH, PENNSYLVANIA.

ROLLER SIDE BEARING.

Application filed May 12, 1922. Serial No. 560,335.

*To all whom it may concern:*

Be it known that I, ARNOLD STUCKI, a citizen of the United States, and a resident of Pittsburgh, in the county of Allegheny and State of Pennsylvania, have invented a new and useful Improvement in Roller Side Bearings, of which the following is a specification.

This invention relates to roller side bearings for railway cars, and particularly to a side bearing adapted to be attached to the truck or lower bolster, and cooperating with an upper bearing plate attached to the car body.

One of the objects of the invention is the provision of a bearing of this type in which the roller is self-centering, in which the liability of the roller developing flat spots on its circumference, or recesses on the track upon which the roller runs, thus interfering with the free travel of the rolling element, is prevented, and in which the roller gravitates to the center of its track under its own weight immediately after contact between the roller and the upper bearing surface is broken, that is, as soon as the body of the car lifts sufficiently to break contact with the roller.

It is well known that in practical operation when the body wear-plate first contacts the roller in a bearing of this type, that there is a tendency for the roller to be moved laterally away from the center of the truck for a short distance, due to the lost motion between the center plates of the truck and car body. Due to such action, if the roller is positioned midway between the sides of the housing at the moment of contact, it will be moved towards the outer wall of the cage and is frequently brought into contact therewith, resulting in unnecessary and excessive wear between the contacting parts, especially during subsequent longitudinal travel of the roller.

It is a special object of the invention to provide a bearing in which the roller will tend towards the longitudinal axis of the truck while inoperative, that is, while the roller is out of contact with the upper bearing surface, whereby to compensate for any lateral movement thereof produced by contact of the car body and the roller while the car is rounding curves as above described.

It is a further object of the invention to provide a bearing which is self-cleaning under normal operating conditions, which is simple in construction, efficient in operation, and economical to manufacture, and it is still a further object to provide a device which will function as a plain bearing in case the roller should become lost or broken.

These and other objects of the invention will more readily appear when taken in connection with the following description and the appended claims.

Figure 2:
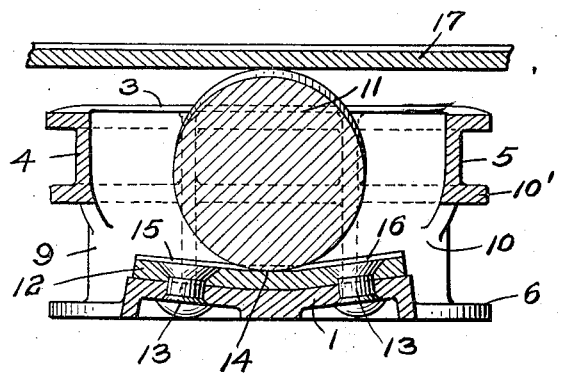
Figure 3:
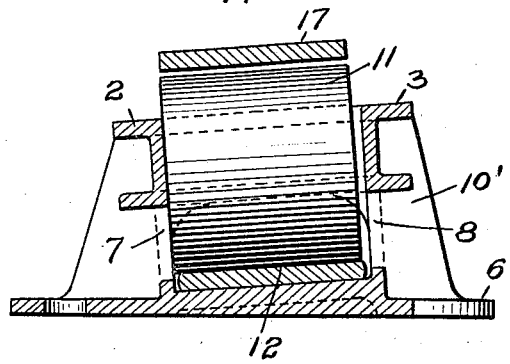

In the accompanying drawings, Fig. 1 is a plan view of the preferred construction embodying the invention; Fig. 2, a transverse sectional view taken through the upper wear-plate and the body of the bearing; and Fig. 3, a transverse sectional view taken on the line III—III of Fig. 1.

The bearing comprises a cage or housing having a bottom 1, side walls, 2, 3 and end walls 4, 5, and extending from the housing are ears or lugs 6 provided with apertures for receiving bolts or rivets for connecting the bearing to the bolster of the truck. The side walls 2 and 3 are provided with the openings 7 and 8, respectively, and the end walls 4 and 5 with the respective openings 9 and 10, all of said openings being positioned near the lower portion of the housing so as to render the bearings self-cleaning. The housing is also equipped with the strengthening ribs 10'.

The bottom 1 serves as a lower bearing surface for the roller 11 disposed within the housing, and is preferably equipped with a suitable wear-plate 12 attached in any suitable manner as by riveting, as indicated at 13.

The wear-plate 12 has a straight intermediate portion 14 and inclined end portions 15 and 16, said end portions being inclined downwardly from the extremities of the wear-plate towards the intermediate portion 14. The intermediate portion 14 is also inclined downwardly throughout its entire width from the outer side wall 3 towards the inner side wall 2, as clearly shown in Fig. 3. The end portions 15 and 16 may also be inclined in a like fashion as shown in Fig. 2.

The roller 11 is cylindrical in shape, and cooperates with the bearing plate 12 and the upper wear-plate indicated at 17 which is attached to the car body in any well known manner. The upper wear-plate 17 is of sufficient size that should the roller 11 become lost or broken, the same will contact the upper surface of the walls of the housing and cooperate therewith to form a plain bearing.

The operation of the device is as follows: The roller 11 normally rests upon the straight intermediate portion 14, and due to the inclination of the same towards the longitudinal axis of the truck, the roller tends in the direction of and hugs the inner side wall 2. Whenever the car body sways sufficiently to bring the upper bearing plate 17 into contact with the roller, the roller is moved due to the lost motion between the center plates as above described, towards the outer side wall 3 so as to be properly located centrally of the lower bearing plate. Any subsequent swiveling movement of the truck will cause the roller 11 to ride up on the inclined end portions 15 and 16 of the lower bearing plate. As soon as the body lifts the contact between the bearing plate 17 and the roller is broken, permitting the roller to gravitate under its own weight back to the straight central portion 14. The return of the roller occurs immediately upon the lifting of the car body and without the use of any auxiliary mechanism or parts. This quick return, due to the lack of all lost motion devices, is found to be of great importance in practical use, and with applicant's device is secured by a very simple construction.

Due to the downward inclination of the bearing plate 12 towards the inner side wall of the housing, the roller gradually creeps theretowards after contact with the roller is broken, and constantly hugs the said wall until the parts are again brought into contact to repeat the above cycle of operations.

Due to the fact that the central portion 14 is of an appreciable length, the roller 11 will not always come to rest at the same point, but at various points throughout its length and will rest upon various parts of its own periphery, thus assuring substantially uniform wear of both the bearing plate and the roller. Besides, the roller 11 when thrown against the end walls by severe end shocks will rotate somewhat to present new lines of contact.

Any dirt or foreign substances collecting within the housing or upon the lower bearing plate, during the operation of the device will find its way to the openings 7, 8, 9 and 10, which are so disposed as to permit the same to readily escape, thus rendering the bearing self-cleaning.

It is thus seen that the construction described provides a bearing which is simple, durable, inexpensive to manufacture, which is quickly responsive and self-centering, which overcomes the disadvantages arising from the action of centrifugal force and the lost motion between the parts during the rounding of curves, which compensates for lateral displacement of the roller due to initial contact with the upper bearing plate and which is self-cleaning.

I claim:

1. A side bearing for lower bolsters of railway cars comprising a housing having its bottom forming a bearing surface and provided with side and end walls, a free roller in the housing and resting on the bearing surface, the entire width of said bearing surface being inclined downwardly towards the inner side wall, whereby the roller will tend towards the said inner side wall.

2. A side bearing for lower bolsters or railway cars comprising a housing having its bottom forming a bearing surface and provided with side and end walls, a disconnected free roller in the housing and resting on the bearing surface, the bearing surface being inclined downwardly from its extremities towards a straight intermediate portion to center the roller, and the entire width of said bearing surface being also inclined downwardly towards the inner side wall whereby the roller will tend towards the said inner side wall.

3. A side bearing for lower bolsters of railway cars comprising a housing having a bottom forming a bearing surface and provided with straight substantially parallel side walls and end walls, a free cylindrical roller in the housing and resting on the bearing surface, the bearing surface being inclined downwardly from its extremities towards a straight intermediate portion to center the roller, said straight intermediate portion throughout its entire width being inclined downwardly towards the said straight inner side wall whereby to cause the roller to tend to move laterally in the same direction regardless of its position upon said intermediate portion causing it to hug the said inner wall when the roller is out of contact with the upper bearing plate.

In testimony whereof, I sign my name.

ARNOLD STUCKI.

Witness:
EDWIN O. JOHNS.